United States Patent
Hu et al.

(10) Patent No.: US 11,456,819 B2
(45) Date of Patent: Sep. 27, 2022

(54) PARTIAL PSEUDO-RANDOMIZATION PROCESSING METHOD, AND CORRESPONDING APPARATUS AND DEVICE, AND STORAGE MEDIUM

(71) Applicant: ZTE CORPORATION, Shenzhen (CN)

(72) Inventors: Yuzhou Hu, Shenzhen (CN); Zhifeng Yuan, Shenzhen (CN); Weimin Li, Shenzhen (CN); Jianqiang Dai, Shenzhen (CN); Li Tian, Shenzhen (CN); Hong Tang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/059,098

(22) PCT Filed: May 28, 2019

(86) PCT No.: PCT/CN2019/088816
§ 371 (c)(1),
(2) Date: Nov. 25, 2020

(87) PCT Pub. No.: WO2019/228349
PCT Pub. Date: Dec. 5, 2019

(65) Prior Publication Data
US 2021/0226729 A1     Jul. 22, 2021

(30) Foreign Application Priority Data
May 29, 2018 (CN) .......................... 201810533294.2

(51) Int. Cl.
*H04L 1/00* (2006.01)
*H03M 13/00* (2006.01)
*H04L 1/06* (2006.01)

(52) U.S. Cl.
CPC .......... *H04L 1/0061* (2013.01); *H04L 1/0043* (2013.01); *H04L 1/0048* (2013.01); *H04L 1/0052* (2013.01); *H04L 1/0057* (2013.01)

(58) Field of Classification Search
CPC ... H04L 1/0061; H04L 1/0043; H04L 1/0048; H04L 1/0052; H04L 1/0057
See application file for complete search history.

(56) References Cited

U.S. PATENT DOCUMENTS 8,935,589 B2 *   1/2015   Yang .................. G06F 11/1072
                                                714/758
9,898,611 B2 *   2/2018   Gibart .................. H04L 9/0668
(Continued)

FOREIGN PATENT DOCUMENTS

CN        101141214 A    3/2008
CN        101599811 A    12/2009
(Continued)

OTHER PUBLICATIONS

Chinese Office Action for Application No. 201810533294.2, dated Sep. 1, 2021, 19 pages including translation.
(Continued)

*Primary Examiner* — Justin R Knapp
(74) *Attorney, Agent, or Firm* — Morgan, Lewis & Bockius LLP

(57) ABSTRACT

Provided are a partial pseudo-randomization processing method, a corresponding apparatus, a device and a storage medium. The method includes performing pseudo-randomization processing on part of N bits $b_1, b_2, \ldots, b_N$ to generate new N bits $d_1, d_2, \ldots, d_N$; and encoding the $d_1, d_2, \ldots, d_N$.

20 Claims, 6 Drawing Sheets

1. Encoding process

2. Decoding process

(56) References Cited

U.S. PATENT DOCUMENTS

| | | | |
|---|---|---|---|
| 10,476,722 B2* | 11/2019 | Wang | H04L 27/2655 |
| 10,567,123 B2* | 2/2020 | Pepper | H04L 1/0045 |
| 10,789,165 B2* | 9/2020 | Yamamoto | H04L 1/0071 |
| 10,958,304 B2* | 3/2021 | Park | H04L 1/005 |
| 2007/0133804 A1 | 6/2007 | Kasher | |
| 2008/0159537 A1 | 7/2008 | Khan et al. | |
| 2009/0063936 A1 | 3/2009 | Kanda et al. | |
| 2016/0366717 A1* | 12/2016 | Yang | H04W 72/0406 |
| 2021/0037517 A1* | 2/2021 | Lei | H04W 72/0466 |

FOREIGN PATENT DOCUMENTS

| | | |
|---|---|---|
| CN | 102273298 A | 12/2011 |
| CN | 103684664 A | 3/2014 |
| CN | 103840909 A | 6/2014 |
| CN | 103986684 A | 8/2014 |
| CN | 104283627 A | 1/2015 |
| CN | 104349472 A | 2/2015 |
| CN | 104853339 A | 8/2015 |
| CN | 106021163 A | 10/2016 |
| CN | 107342774 A | 11/2017 |
| CN | 107613509 A | 1/2018 |
| WO | WO-2015109461 A1 | 7/2015 |

OTHER PUBLICATIONS

Huawei, "On data channel scrambling", *3GPP TSG RAN WG1 Meeting #90*, R1-171215, Aug. 21-25, 2017, 3 pages.

International Search Report for Application No. PCT/CN2019/088816, dated Aug. 16, 2019, 4 pages.

Chinese Second Office Action for Application No. 201810533294.2, dated Mar. 23, 2022, 25 pages including translation.

Chinese Supplemental Search Report for Application No. 201810533294.2, dated Mar. 18, 2022, 6 pages including translation.

Extended European Search Report for Application No. 19811463.9, dated Feb. 2, 2022, 9 pages.

\* cited by examiner

PARTIAL PSEUDO-RANDOMIZATION PROCESSING METHOD, AND CORRESPONDING APPARATUS AND DEVICE, AND STORAGE MEDIUM

CROSS-REFERENCE TO RELATED APPLICATIONS

This is a National Stage Application filed under 35 U.S.C. 371 based on International Patent Application No. PCT/CN2019/088816, filed on May 28, 2019, which claims priority to Chinese Patent Application No. 201810533294.2 filed on May 29, 2018, the disclosures of both of which are incorporated herein by reference in their entireties.

TECHNICAL FIELD

The present disclosure relates to the technical field of communication, and in particular to a partial pseudo-randomization processing method, a corresponding apparatus, a device, and a storage medium.

BACKGROUND

Pseudo-randomization processing of a bit sequence that needs to be transmitted can increase the randomness of the bit sequence. If different users use different pseudo-randomization processing for bit sequences, the pseudo-randomization processing can also reduce the correlation of the bit sequences of different users to thus achieve the effect of inter-user interference randomization, which will bring two benefits described below. 1. After the inter-user interference randomization is achieved, the detection performance of user data symbols will be more robust. 2. In non-orthogonal multiple access scenarios, a receiver needs to use correctly decoded user data to improve the precision of its channel estimation (this technology may be referred to as data-assisted channel estimation technology, or data-pilot technology), so that a reconstructed signal is more accurate and thus the residual error of interference cancellation is smaller, where pseudo-randomization of bits between users can improve the accuracy of this channel estimation. This can further improve the performance of the entire interference cancellation receiver.

Inter-user interference randomization is particularly effective for scenarios where user data characteristics are the same. For example, for applications such as electricity meters, the electricity meters may report the power consumption of the past month on the same day of each month, so the messages that these different users may send are "so far, the power consumption is xxx", the source bits used to represent this information will be very similar, and the inter-user interference randomization can play a very good role when the users are distinguished by the receiver.

A transmitting side performs pseudo-randomization processing on the bit sequence that needs to be transmitted, and a receiving side needs to perform pseudo-randomization removing processing on a corresponding bit sequence, which requires the receiving side to know the pseudo-random processing method of the transmitting side.

Pseudo-randomization processing of the bit sequence that needs to be transmitted can be achieved in different methods. One of the classic and most commonly used methods is to use a pseudo-random bit sequence to scramble the bit sequence that needs to be transmitted. Therefore, the pseudo-random bit sequence used may also be referred to as a scrambling code sequence, which is usually generated by a pseudo-sequence generator. The scrambling process is a process of performing an XOR operation on the bit sequence to be transmitted and the bit corresponding to the scrambling code sequence to generate a new bit sequence.

The transmitting side performs scrambling processing on the bit sequence that needs to be transmitted, and the receiving side needs to perform descrambling processing on the corresponding bit sequence. Similarly, for the descrambling processing, the receiving side needs to know the scrambling code used by the transmitting side.

In the existing communication methods, a bit pseudo-randomization process in which a user uses a UE-specific scrambling code to scramble the bit sequence to be transmitted has been supported. However, the existing scrambling code scheme is to scramble codeword bits output by a Forward Error Correction (FEC) encoder. The descrambling on the receiving side is correspondingly to descramble codewords before forward error correction decoding, and then perform FEC decoding. The forward error correction encoding is also referred to as a channel error correction encoding. Classic forward error correction encoding includes convolutional encoding, Reed-solomon (RS) encoding, Low Density Parity Check Code (LDPC) encoding, Turbo encoding, Polar encoding, or the like.

In the existing communication methods, the receiving side knows the scrambling code used by the transmitting side before performing decoding, so the receiving side can easily complete the descrambling operation and then performs decoding. However, when the existing scrambling code scheme is applied to grant-free (truly grant free, autonomous grant-free) transmission, the descrambling of the receiving side (such as a base station) before FEC decoding will have the problems described below.

1. Since uncertainty exists in user detection, the receiving side cannot know the scrambling code exactly before FEC decoding is performed, which brings serious performance degradation to descrambling and decoding. For example, for grant-free (truly grant free, autonomous grant-free) data transmission without reference signals, the user detection at the receiving side is uncertain, so the scrambling code cannot be known exactly before FEC decoding is performed; for the grant-free (truly grant free, autonomous grant-free) data transmission with the reference signals, although the scrambling code information can be obtained by detecting the reference signals using a pre-defined (configured/pre-configured) association rule between the reference signals and the scrambling code, if the number of reference signals is limited, the user detection based on the reference signals cannot be guaranteed to be absolutely accurate, and therefore the scrambling code cannot be known exactly before the FEC decoding is performed.

2. A grant-free (truly grant free, autonomous grant-free) receiver can avoid the uncertainty of the scrambling code caused by the uncertainty of user detection by exhausting all possible scrambling codes, but this means that each scrambling code needs to be descrambled once and then subjected to FEC decoding once, which may result in too high FEC decoding complexity.

3. For the grant-free (truly grant free, autonomous grant-free) transmission scenario where the user randomly selects a transmission signature, if the transmission is the grant-free (truly grant free, autonomous grant-free) data transmission with reference signals and the reference signals and scrambling codes are related, when the user randomly selects a reference signal and a scrambling code, different users may select the same reference signal and the same scrambling code, that is, collision occurs. In this case, even if the receiving side can detect the collided reference signal, the receiving side can only estimate the sum of the channels of the collided users by using the collided reference signal for channel estimation, but cannot estimate the channel of each collided user. The scrambling code of the collided users is the same, and data randomness of the collided users may be insufficient, so the interference randomness is not enough. Even if one user can be decoded correctly, the channel estimation of the user must be obtained to eliminate the interference of the user with correct decoding. The collision of the reference signal reduces the precision of the channel estimation of the user, the collision of the scrambling code also causes the precision of the channel estimation of the data of the user with correct decoding applied by the receiving side to be reduced, and finally, the interference cancellation of the data of the user with correct decoding is not accurate enough, the residual interference is large, and the demodulation performance of the following user is reduced.

For the above-mentioned problems, no effective solutions have been proposed.

SUMMARY

In order to overcome the above-mentioned drawbacks, the technical problem to be solved by the present disclosure is to provide a partial pseudo-randomization processing method, a corresponding apparatus, a device, and a storage medium, so as to at least improve the performance of the grant-free (truly grant free, autonomous grant-free) transmission.

To solve the above technical problem, a partial pseudo-randomization processing method in an embodiment of the present disclosure includes: performing pseudo-randomization processing on part of N bits $b_1, b_2, \ldots, b_N$ to generate new N bits $d_1, d_2, \ldots, d_N$; and encoding the $d_1, d_2, \ldots, d_N$.

To solve the above technical problem, a partial pseudo-randomization processing method in an embodiment of the present disclosure includes: decoding encoded N bits; and performing pseudo-randomization removing processing on K bits among the decoded N bits to recover N bits before pseudo-randomization processing is performed on a transmitting side; where K is greater than 0 and less than or equal to N.

To solve the above technical problem, an encoding apparatus in an embodiment of the present disclosure includes a processing module and an encoding module.

The processing module is configured to perform pseudo-randomization processing on part of N bits $b_1, b_2, \ldots, b_N$ to generate new N bits $d_1, d_2, \ldots, d_N$.

The encoding module is configured to encode the $d_1, d_2, \ldots, d_N$.

To solve the above technical problem, a decoding apparatus in an embodiment of the present disclosure includes a decoding module and a removing module.

The decoding module is configured to decode encoded N bits.

The removing module is configured to perform pseudo-randomization removing processing on K bits among the decoded N bits to recover N bits before pseudo-randomization processing is performed on a transmitting side; where K is greater than 0 and less than or equal to N.

To solve the above technical problem, a transmitting device in an embodiment of the present disclosure includes a memory and a processor; the memory is configured to store an encoding computer program executable by the processor to implement the above-mentioned steps of the method for the transmitting side.

To solve the above technical problem, a receiving device in an embodiment of the present disclosure includes a memory and a processor; the memory is configured to store a decoding computer program executable by the processor to implement the steps of the above-mentioned method for the receiving side.

To solve the above technical problem, a computer storage medium in an embodiment of the present disclosure is configured to store at least one of an encoding computer program or a decoding computer program.

When the encoding computer program is executed by at least one processor, the encoding computer program is used for implementing the above-mentioned steps of the method for the transmitting side.

When the decoding computer program is executed by at least one processor, the decoding computer program is used for implementing the above-mentioned steps of the method for the receiving side.

The beneficial effects of the present disclosure are as described below.

In the embodiments of the present disclosure, before encoding is performed, pseudo-randomization processing is performed on part of N bits to be encoded, so that on the premise of ensuring the interference randomization effect, performance of grant-free (truly grant free, autonomous grant-free) transmission can be effectively improved, complexity of encoding and decoding in the grant-free (truly grant free, autonomous grant-free) transmission can be effectively reduced, and demodulation performance can be effectively improved.

DETAILED DESCRIPTION

In order to solve the problems of the existing art, the present disclosure provides a partial pseudo-randomization processing method, a corresponding apparatus, a device, and a storage medium. The present disclosure will be described in further detail below with reference to the drawings and embodiments. It is to be understood that embodiments described herein are intended to explain the present disclosure, and not to limit the present disclosure.

In the following description, suffixes such as "module", "component", or "unit" used to indicate elements are used merely for facilitating the explanation of the present disclosure, and have no particular meaning in themselves. Therefore, "module", "component" or "unit" can be used in a mixed manner.

Prefixes such as "first" and "second" used to distinguish elements are used merely for facilitating the description of the present disclosure, and have no specific meaning in themselves.

Embodiment One

Figure 1:
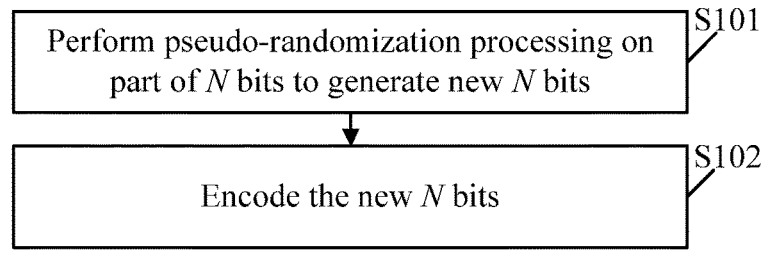
FIG. 1 is a flowchart of a partial pseudo-randomization processing method on a transmitting side according to an embodiment of the present disclosure.

The embodiment of the present disclosure provides a partial pseudo-randomization processing method. As shown in FIG. 1, the method includes the steps described below.

In S101, pseudo-randomization processing is performed on part of N bits $b_1, b_2, \ldots, b_N$ to generate new N bits $d_1, d_2, \ldots, d_N$.

In S102, the $d_1, d_2, \ldots, d_N$ is encoded. In some embodiments, the encoding may include forward error correction (FEC) encoding or cyclic redundancy check (CRC) encoding; the forward error correction (FEC) encoding includes convolutional encoding, RS encoding, LDPC encoding, Turbo encoding Polar encoding, etc., and N is a positive integer.

The method in the embodiment of the present disclosure is executed on a transmitting side (for example, a base station). In the embodiment of the present disclosure, before the FEC encoding or the CRC encoding is performed, the pseudo-randomization processing is performed on the part of N bits $b_1, b_2, \ldots, b_N$ to generate the new N bits $d_1, d_2, \ldots, d_N$ and the corresponding FEC or CRC encoding is performed on the $d_1, d_2, \ldots, d_N$, so that on the premise of ensuring the interference randomization effect, performance of grant-free (truly grant free, autonomous grant-free) transmission can be effectively improved, complexity of encoding and decoding in the grant-free (truly grant free, autonomous grant-free) transmission can be effectively reduced, and demodulation performance can be effectively improved. The problems described below can be effectively solved.

1. Since uncertainty exists in user detection, the receiving side cannot know the scrambling code exactly before FEC decoding is performed, which brings serious performance problems to descrambling and decoding. For example, for grant-free (truly grant free, autonomous grant-free) data transmission without reference signals, the user detection at the receiving side is uncertain, so the scrambling code cannot be known exactly before FEC decoding is performed; for the grant-free (truly grant free, autonomous grant-free) data transmission with the reference signals, although the scrambling code information can be obtained by detecting the reference signals in a manner of binding the reference signals and the scrambling code, if the reference signals are fewer, the user detection based on the reference signals cannot be guaranteed to be absolutely accurate, and therefore the scrambling code cannot be known exactly before the FEC decoding is performed.

2. A grant-free (truly grant free, autonomous grant-free) receiver can avoid the uncertainty of the scrambling code caused by the uncertainty of user detection by traversing all possible scrambling codes, but this means that each scrambling code needs to be descrambled once and then subjected to FEC decoding once, which may result in too high FEC decoding complexity.

3. For the grant-free (truly grant free, autonomous grant-free) transmission scenario where the user randomly selects a transmission signature, if the transmission is the grant-free (truly grant free, autonomous grant-free) data transmission with reference signals and the reference signals and scrambling codes are bound, when the user randomly selects a reference signal and a scrambling code, different users may select the same reference signal and the same scrambling code, that is, collision occurs. In this case, even if the receiving side can detect the collided reference signal, the receiving side can only estimate the sum of the channels of the collided users by using the collided reference signal for channel estimation, but cannot estimate the channel of each collided user. The scrambling code of the collided users is the same, and data randomness of the collided users may be insufficient, so the interference randomness is not enough. Even if one user can be decoded correctly, the channel estimation of the user must be obtained to eliminate the interference of the user with correct decoding. The collision of the reference signal reduces the precision of the channel estimation of the user, the collision of the scrambling code also causes the precision of the channel estimation of the data of the user with correct decoding applied by the receiving side to be reduced, and finally, the interference cancellation of the data of the user with correct decoding is not accurate enough, the residual interference is large, and the demodulation performance of the following user is reduced.

In some embodiments, the step of performing pseudo-randomization processing on part of the N bits $b_1, b_2, \ldots, b_N$ to generate new N bits $d_1, d_2, \ldots, d_N$ may include: assuming that the $b_1, b_2, \ldots, b_N$ includes K bits $b_1^R, b_2^R, \ldots, b_K^R$ and other (N−K) bits $b_1^U, b_2^U, \ldots, b_{N-K}^U$; and assuming that the $d_1, d_2, \ldots, d_N$ includes K bits $d_1^R, d_2^R, \ldots, d_K^R$ and other (N−K) bits $d_1^U, d_2^U, \ldots, d_{N-K}^U$; performing pseudo-randomization processing on the $b_1^R, b_2^R, \ldots, b_K^R$ to generate the $d_1^R, d_2^R, \ldots, d_K^R$; and not performing pseudo-randomization processing on the $b_1^U, b_2^U, \ldots, b_{N-K}^U$ and taking the $b_1^U, b_2^U, \ldots, b_{N-K}^U$ as the $d_1^U, d_2^U, \ldots, d_{N-K}^U$ directly; where the pseudo-randomization processing in the step of performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_K^R$ or jointly determined by the $b_1^U, b_2^U, \ldots, b_{N-K}^U$ and information S agreed with a receiving side, or jointly determined by the $b_1^U, b_2^U, \ldots, b_{N-K}^U$ and a bit sequence M agreed with a receiving side; where K is greater than 0 and less than or equal to N.

In some embodiments, the step of performing pseudo-randomization processing on part of the N bits $b_1, b_2, \ldots, b_N$ to generate new N bits $d_1, d_2, \ldots, d_N$ may further include: assuming that the $b_1, b_2, \ldots, b_N$ includes K bits $b_1^R, b_2^R, \ldots, b_K^R$ and other (N−K) bits $b_1^U, b_2^U, \ldots, b_{N-K}^U$ assuming that the $d_1, d_2, \ldots, d_N$ includes K bits $d_1^R, d_2^R, \ldots, d_K^R$ and other (N−K) bits $d_1^U, d_2^U, \ldots, d_{N-K}^U$ performing pseudo-randomization processing on the (generate the $d_1^R, d_2^R, \ldots, d_K^R$; and processing the $b_1^U, b_2^U, \ldots, b_{N-K}^U$ in a manner which is agreed with a receiving side to generate the $d_1^U, d_2^U, \ldots, d_{N-K}^U$; where the pseudo-randomization processing in the step of performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_{N-K}^U$, or determined by the $d_1^U, d_2^U, \ldots, d_{N-K}^U$, or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side together, or jointly determined by the $d_1^U, d_2^U, \ldots, d_{N-K}^U$ and information S agreed with the receiving side, or jointly determined by the $d_1^U, d_2^U, \ldots, d_{N-K}^U$ and a bit sequence M agreed with the receiving side; where K is greater than 0 and less than or equal to N.

In some embodiments, the step of performing pseudo-randomization processing on part of the N bits $b_1, b_2, \ldots, b_N$ to generate new N bits $d_1, d_2, \ldots, d_N$ may further include: assuming that the $b_1, b_2, \ldots, b_N$ includes K bits $b_1^R, b_2^R, \ldots, b_K^R$ and other (N−K) bits $b_1^U, b_2^U, \ldots, b_{N-K}^U$; and assuming that the $d_1, d_2, \ldots, d_N$ includes K bits $d_1^R, d_2^R, \ldots, d_K^R$ and other (N−K) bits $d_1^U, d_2^U, \ldots, d_{N-K}^U$; performing scrambling processing on the $b_1^R, b_2^R, \ldots, b_K^R$ by using pseudo-random sequence $c_1, c_2, \ldots, c_K$ of length K to generate the $d_1^R, d_2^R, \ldots, d_K^R$; and not performing scrambling processing on the $b_1^U, b_2^U, \ldots, b_{N-K}^U$ and taking the $b_1^U, b_2^U, \ldots, b_{N-K}^U$ as the $d_1^U, d_2^U, \ldots, d_{N-K}^U$ directly; where generation of the pseudo-random sequence $c_1, c_2, \ldots, c_K$ of length K is determined by the $b_1^U, b_2^U, \ldots, b_{N-K}^U$, or jointly determined by the $b_1^U, b_2^U, \ldots, b_{N-K}^U$ and information S agreed with a receiving side, or jointly determined by the $b_1^U, b_2^U, \ldots, b_{N-K}^U$ and a bit sequence M agreed with a receiving side; where K is greater than 0 and less than or equal to N.

In some embodiments, the step of performing pseudo-randomization processing on part of the N bits $b_1, b_2, \ldots, b_N$ to generate new N bits $d_1, d_2, \ldots, d_N$ may also include: assuming that the $b_1, b_2, \ldots, b_N$ includes K bits $b_1^R, b_2^R, \ldots, b_K^R$ and other (N−K) bits $b_1^U, b_2^U, \ldots, b_{N-K}^U$; and assuming that the $d_1, d_2, \ldots, d_N$ includes K bits $d_1, d_2, \ldots, d_K^R$ and other (N−K) bits $d_1^U, d_2^U, \ldots, d_{N-K}^U$; performing scrambling processing on the $b_1^R, b_2^R, \ldots, b_K^R$ by using a pseudo-random sequence $c_1, c_2, \ldots, c_K$ of length K to generate the $d_1^R, d_2^R, \ldots, d_K^R$; and processing the $b_1^U, b_2^U, \ldots, b_{N-K}^U$ in a manner which is agreed with a receiving side to generate the $d_1^U, d_2^U, \ldots, d_{N-K}^U$; where generation of the pseudo-random sequence $c_1, c_2, \ldots, c_K$ of length K is determined by the $b_1^U, b_2^U, \ldots, b_{N-K}^U$, or determined by the $d_1^U, d_2^U, \ldots, d_{N-K}^U$, or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side, or jointly determined by the $d_1^U, d_2^U, \ldots, d_{N-K}^U$ and information S agreed with the receiving side, or jointly determined by the $d_1^U, d_2^U, \ldots, d_{N-K}^U$ and a bit sequence M agreed with the receiving side; where K is greater than 0 and less than or equal to N.

In some embodiments, the step of processing the $b_1^U, b_2^U, \ldots, b_{N-K}^U$ in a manner which is agreed with a receiving side to generate the $d_1^U, d_2^U, \ldots, d_{N-K}^U$ may also include at least one of: processing the $b_1^U, b_2^U, \ldots, b_{N-K}^U$ by using information agreed with the receiving side to generate the $d_1^U, d_2^U, \ldots, d_{N-K}^U$, where the information agreed with the receiving side includes one of: a system frame index (that is a system frame number), a transmission slot index (that is a transmission slot number or a symbol index), a cell identifier, a sector identifier, a beam identifier, related information of a preamble and a demodulation pilot, or agreed information; or processing the $b_1^U, b_2^U, \ldots, b_{N-K}^U$ by using a bit sequence agreed with the receiving side to generate the $d_1^U, d_2^U, \ldots, d_{N-K}^U$, where the bit sequence agreed with the receiving side includes one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

The pseudo-randomization processing includes scrambling processing, that is, the scrambling code can be generated according to the unscrambled (N−K) bits in the embodiment of the present disclosure; or the scrambling code can be generated according to the unscrambled (N−K) bits and the information S agreed with the receiving side; or the scrambling code can be generated according to the unscrambled (N−K) bits and the bit sequence M agreed with the receiving side.

The information S agreed with the receiving side includes at least one of: a system frame index (that is a system frame number), a transmission slot index (that is a transmission slot number or a symbol index), a cell identifier, a sector identifier, a beam identifier, related information of a preamble and a demodulation pilot, or agreed information.

The bit sequence M agreed with the receiving side includes at least one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

The related information of a preamble and a demodulation pilot may also include one of: a preamble root index, a cyclic shift sequence index, a demodulation pilot root index, a demodulation pilot cyclic shift sequence index, a demodulation reference signal (DMRS) comb pattern, or a demodulation reference signal (DMRS) orthogonal cover code (OCC) pattern.

In other words, in some embodiments, the generation of the scrambling code depends on any one of the following information: unscrambled (N−K) bits, unscrambled (N−K) bits and a system frame index (that is a system frame number), a transmission slot index (that is a transmission slot number), a cell identifier, a sector identifier, a beam identifier, related information of a preamble and a demodulation pilot, or agreed information.

For example, in some embodiments, when the above-mentioned encoding includes the FEC encoding, the codeword bits can be obtained by encoding the scrambled K bits and the unscrambled (N−K) bits in the method described below.

A scrambling code generator of an (N−K)-bit shift register is used and the unscrambled (N−K) bits are taken as an initial value of the scrambling code generator to generate a scrambling code sequence having a length of K.

Alternatively, the unscrambled (N−K) bits and the information S or bit sequence M agreed with the receiving side jointly generate (N−K) bits, and then the (N−K) bits jointly generated are used as the initial value of the scrambling code generator to generate the scrambling code sequence having the length of K.

Figure 2:
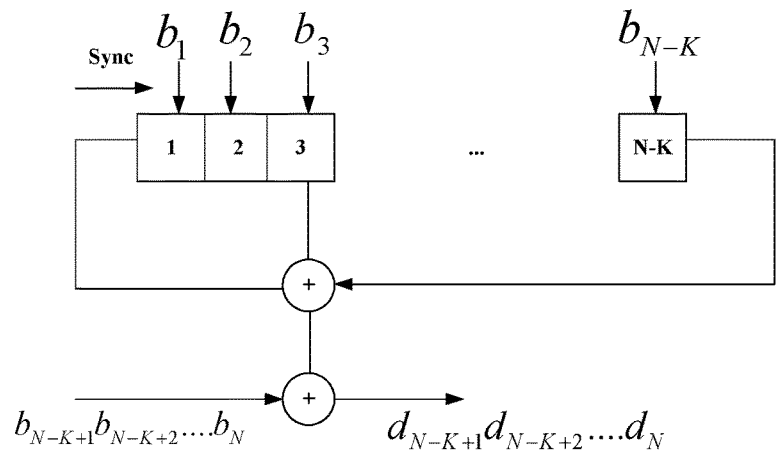
FIG. 2 is a schematic diagram of a process of scrambling K bits by an (N−K)-bit shift register according to an embodiment of the present disclosure.

As shown in FIG. 2 and the following example formula, the original N bits are $b_1, b_2, \ldots, b_N$ the generated scrambling code of length K is C, the scrambled data is d, the value of $N_c$ may be 1600, and $b_1, b_2, \ldots, b_{N-K}$ are (N−K) bits.

$$b_{n+N-K} = n(b_{n+2} + b_n) \bmod 2 \quad (1)$$

$$c_n = b_{n+N} \quad (2)$$

$$d_{N-K+1} d_{N-K+2} \cdots d_N = b_{N-K+1} b_{N-K+2} \cdots b_N c_1 c_2 c_3 \cdots c_K \quad (3)$$

$$d_1 d_2 \cdots d_{N-K} = b_1 b_2 \cdots b_{N-K} \quad (4)$$

For another example, in some embodiments, when the above mentioned encoding includes the FEC encoding, the codeword bits can be obtained by encoding the scrambled K bits and the unscrambled (N−K) bits in the following method.

Figure 3:
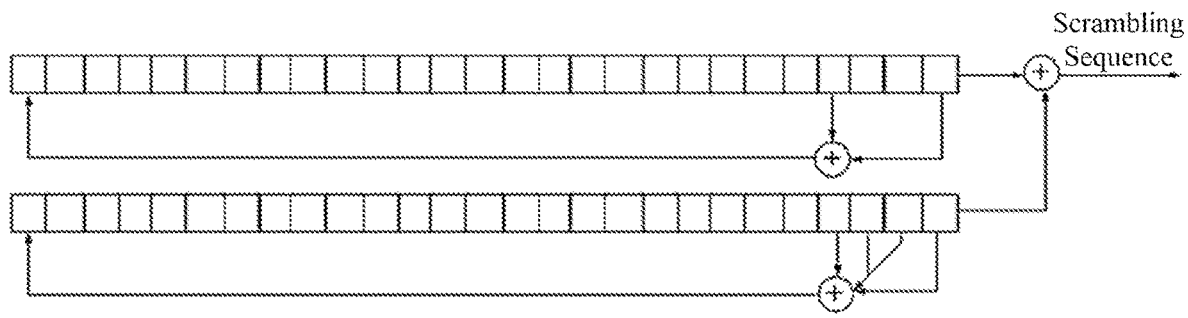
FIG. 3 is a schematic diagram of an LTE/NR scrambling code generation process according to an embodiment of the present disclosure.

A scrambling code sequence is jointly generated by using (N−K) bits and an initial sequence of length (N−K), and the scrambling code sequence is obtained by operating the shift register and performing specific operations on the two processed sequences. As shown in FIG. 3 and the following example formula for scrambling code generation in NR/LTE, where $x_1$ is initialized to be (N−K) bits, and then formula (6) is used to generate a new $x_1$, and the value of $c_{init}$ is determined by at least one of: a system frame index (that is a system frame number), a transmission slot index (that is a transmission slot number or a symbol index), a cell identifier (ID), a sector identifier (ID), a beam identifier (beam ID), a preamble root index, a cyclic shift sequence index, a demodulation pilot root index, a demodulation pilot cyclic shift sequence index, a demodulation reference signal (DMRS) comb pattern, a demodulation reference signal (DMRS) orthogonal cover code (OCC) pattern, or agreed message.

$$c_n = (x_1(n + N_c) + x_2(n + N_c)) \bmod 2 \quad (5)$$

$$x_1(n + 31) = (x_1(n + 3) + x_1(n)) \bmod 2 \quad (6)$$

$$x_2(n + 31) = (x_2(n + 3) + x_2(n + 2) + x_2(n + 1) + x_2(n)) \bmod 2 \quad (7)$$

$$c_{init} = \sum_{i=0}^{30} x_2(i) \cdot 2^i \quad (8)$$

In $c_{init} = t_{RNTI} \cdot 2^{15} + n_{ID}$, $n_{RNTI}$ is UE specific information and $n_{ID}$ may include the values described below.

If the higher-layer parameter Data-scrambling-Identity is configured, $n_{ID} \in \{0, 1, 2, \ldots, 1023\}$; Otherwise, $n_{ID}$ takes the cell ID.

$N_c = 1600$; and $x_1(0) = 1$, $x_1(n) = 0$, $n = 1, 2, \ldots, 30$.

In some embodiments, when the encoding includes forward error correction (FEC) encoding, after the step of encoding the $d_1, d_2, \ldots, d_N$, the method may also include the steps described below.

A codeword bit is formed according to the FEC encoding, and a symbol generated after the codeword bit is subjected to constellation modulation is expanded; where the symbol generated after the constellation modulation is a transmit symbol.

Alternatively, a codeword bit is formed according to the FEC coding, and the codeword bit is subjected to multi-dimensional modulation, expanded, and mapped to a corresponding time-frequency resource; or, a codeword bit is formed according to the FEC encoding, and the codeword bit is subjected to multi-dimensional modulation and sparsely mapped to a corresponding time-frequency resource; where s transmit symbol is obtained after the multi-dimensional modulation.

Alternatively, a codeword bit is formed according to the FEC encoding, and codeword bits are interleaved after bit repetition is performed on the codeword bit; where a transmit symbol can be obtained through set processing after the interleaving.

Alternatively, a codeword bit is formed according to the FEC encoding, and codeword bits are scrambled after bit repetition is performed on the codeword bit; where the scrambling is performed after the bit repetition, and then a transmit symbol can be obtained through set processing.

Embodiment Two

Figure 4:
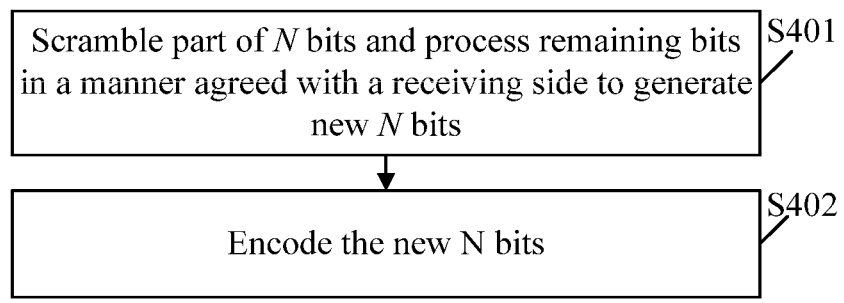
FIG. 4 is a flowchart of an optional partial pseudo-randomization processing method on a transmitting side according to an embodiment of the present disclosure.

The embodiment of the present disclosure provides a partial pseudo-randomization processing method. As shown in FIG. 4, in the embodiment of the present disclosure, a scrambling method in pseudo-randomization processing is taken as an example, and the method includes the steps described below.

In S401, part of N bits are scrambled and remaining bits are processed in a method agreed with a receiving side to generate new N bits, that is, Kbits among the N bits are scrambled, and remaining (N−K) bits are processed in a method agreed with the receiving side to generate new N bits.

In S402, the new N bits are encoded, that is, the scrambled K bits and the (N−K) bits processed in a method agreed with the receiving side are encoded. In some embodiments, the encoding may include forward error correction (FEC) encoding or CRC encoding; the forward error correction (FEC) encoding includes convolutional encoding, RS encoding, LDPC encoding, Turbo encoding, Polar encoding, or the like.

In the embodiment of the present disclosure, before FEC encoding or CRC encoding is performed, K-bit information in N bits to be encoded are scrambled, the remaining (N−K) bits are processed in a method agreed with the receiving side, and then corresponding FEC encoding or CRC encoding is performed on the scrambled K bits and the (N−K) bits processed in the method agreed with the receiving side, thereby effectively reducing the complexity of encoding and decoding in the non-orthogonal multiple access technology, and on the premise of ensuring the interference randomization effect, particularly effectively avoiding multiple-decoding complexity caused by uncertainty of scrambling codes.

In some embodiments, the step of scrambling K bits among the N bits may include: assuming that the N bits include K bits $b_1^R, b_2^R, \ldots, b_K^R$ and other (N−K) bits $b_1^U, b_2^U, \ldots, b_{N-K}^U$; processing the $b_1^U, b_2^U, \ldots, b_{N-K}^U$ in a manner which is agreed with a receiving side to generate $d_1^U, d_2^U, \ldots, d_{N-K}^U$; and performing scrambling processing on the $b_1^R, b_2^R, \ldots, b_K^R$ by using a pseudo-random sequence $c_1, c_2, \ldots, c_K$ of length K to generate $d_1^R, d_2^R, \ldots, d_K^R$. The step of processing the $b_1^U, b_2^U, \ldots, b_{N-K}^U$ in the method which is agreed with the receiving side to generated $d_1^U, d_2^U, \ldots, d_{N-K}^U$ includes: directly taking $b_1^U, b_2^U, \ldots, b_{N-K}^U$ as $d_1^U, d_2^U, \ldots, d_{N-K}^U$ without processing; or processing the $b_1^U, b_2^U, \ldots, b_{N-K}^U$ by using information agreed with the receiving side to generate the $d_1^U$, $d_2^U$, ..., $d_{N-K}^U$, where the information agreed with the receiving side includes one of: a system frame index (that is a system frame number), a transmission slot index (that is a transmission slot number or a symbol index), a cell identifier, a sector identifier, a beam identifier, related information of a preamble and a demodulation pilot, or agreed information; or processing the $b_1^U$, $b_2^U$, ..., $b_{N-K}^U$ by using a bit sequence agreed with the receiving side to generate the $d_1^U$, $d_2^U$, ..., $d_{N-K}^U$, where the bit sequence agreed with the receiving side includes one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

The generation of the pseudo-random sequence $c_1$, $c_2$, ..., $c_K$ of length K is determined by the $b_1^U$, $b_2^U$, ..., $b_{N-K}^U$, or determined by the $d_1^U, d_2^U, ..., d_{N-K}^U$, or jointly determined by the $b_1^U$, $b_2^U$, ..., $b_{N-K}^U$ and information S agreed with the receiving side, or jointly determined by the $b_1^U$, $b_2^U$, ..., $b_{N-K}^U$ and a bit sequence M agreed with the receiving side, or jointly determined by the $d_1^U, d_2^U, ..., d_{N-K}^U$ and information S agreed with the receiving side, or jointly determined by $d_1^U, d_2^U, ..., d_{N-K}^U$ and a bit sequence M agreed with the receiving side.

In some embodiments, the information S agreed with the receiving side may include at least one of: a system frame index (that is a system frame number), a transmission slot index (that is a transmission slot number or a symbol index), a cell identifier, a sector identifier, a beam identifier, related information of a preamble and a demodulation pilot, or agreed information.

In some embodiments, the bit sequence M agreed with the receiving side may include at least one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

The related information of a preamble and a demodulation pilot may also include one of: a preamble root index, a cyclic shift sequence index, a demodulation pilot root index, a demodulation pilot cyclic shift sequence index, a demodulation reference signal (DMRS) comb pattern, or a demodulation reference signal (DMRS) orthogonal cover code (OCC) pattern.

Embodiment Three

Figure 5:
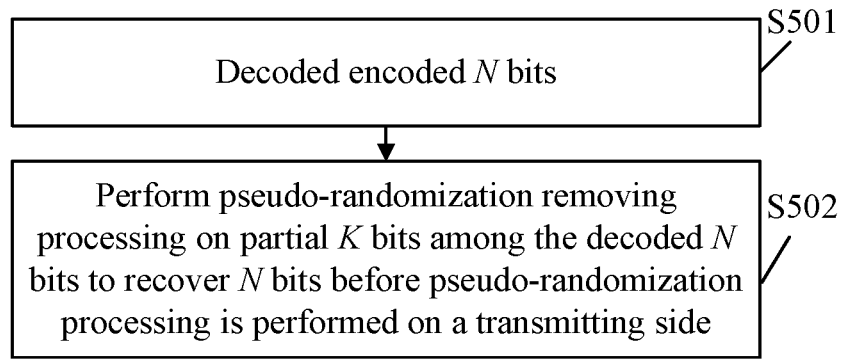
FIG. 5 is a flowchart of a partial pseudo-randomization processing method on a receiving side according to an embodiment of the present disclosure.

The embodiment of the present disclosure provides a partial pseudo-randomization processing method. As shown in FIG. 5, the method includes the steps described below.

In S501, encoded N bits are decoded.

In S502, pseudo-randomization removing processing is performed on K bits among the decoded N bits to recover N bits before pseudo-randomization processing is performed on a transmitting side; where K is greater than 0 and less than or equal to N.

According to the embodiment of the present disclosure, on the premise of ensuring the interference randomization effect, the performance of grant-free (truly grant free, autonomous grant-free) transmission can be effectively improved, the complexity of encoding and decoding in the grant-free (truly grant free, autonomous grant-free) transmission can be effectively reduced, and the demodulation performance can be effectively improved.

The method in the embodiment of the present disclosure is executed on a receiving side (for example, a client).

For example, when the transmitting side performs scrambling processing on part of N bits $b_1, b_2, ..., b_N$ to generate new N bits $d_1, d_2, ..., d_N$ and then performs CRC encoding on $d_1, d_2, ..., d_N$ the receiving side performs descrambling processing on K bits among the N bits that pass a CRC check. The processed N bits constitute the decoded N bits.

When the transmitting side performs scrambling processing on part of the N bits $b_1, b_2, ..., b_N$ to generate new N bits $d_1, d_2, ..., d_N$ and then performs forward error correction (FEC) encoding on $d_1, d_2, ..., d_N$, the receiving side performs descrambling processing on the K bits among the N bits subjected to the forward error correction (FEC) decoding, and then determines whether the N bits part of which are subjected to pseudo-randomization removing processing are correct through the CRC check. The N bits that pass the CRC check constitute the decoded N bits.

In some embodiments, the step of performing pseudo-randomization removing processing on K bits among the decoded N bits may include: performing pseudo-randomization removing processing on the K bits according to other (N−K) bits among the decoded N bits; or performing pseudo-randomization removing processing on the K bits according to other (N−K) bits among the decoded N bits and information S agreed between the transmitting side and a receiving side; or performing pseudo-randomization removing processing on the Kbits according to other (N−K) bits among the decoded N bits and a bit sequence M agreed between the transmitting side and a receiving side.

In some embodiments, the step of performing pseudo-randomization removing processing on K bits among the decoded N bits may include: performing descrambling processing on the K bits by using a pseudo-random sequence of length K.

In some embodiments, the step of performing pseudo-randomization removing processing on K bits among the decoded N bits includes: descrambling scrambled K bits among the decoded N bits. The method for determining the scrambling code during descrambling includes a step described below.

The scrambling code is generated by using a pseudo-random sequence generator based on a shift register, or the scrambling code is determined through a memory or lookup table storing the scrambling code.

In some embodiments, when a pseudo-random sequence generator based on a shift register may be used to generate the scrambling code, an initial state of the pseudo-random sequence generator may be determined according to other (N−K) bits among the decoded N bits, or jointly determined according to other (N−K) bits among the decoded N bits and information S agreed between the transmitting side and the receiving side; or jointly determined according to other (N−K) bits among the decoded N bits and a bit sequence M agreed between the transmitting side and the receiving side.

The information S agreed between the transmitting side and the receiving side includes at least one of: a system frame index (that is a system frame number), a transmission slot index (that is a transmission slot number or a symbol index), a cell identifier, a sector identifier, a beam identifier, related information of a preamble and a demodulation pilot, or agreed information.

The bit sequence M agreed between the transmitting side and the receiving side includes at least one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

In some embodiments, the scrambling code may be looked up based on a scrambling code lookup table to be stored on the receiving side. For example, the scrambling code lookup table stores a scrambling code of length K in each storage unit, has $2^{N-K}$ storage units in total, and stores $2^{N-K}$ scrambling codes with each of length K, that is, the addressing bits of the scrambling code lookup table are (N−K) bits; or one column of the scrambling code lookup table may be (N−K) bits or a certain value or some values obtained by mapping the (N−K) bits, and the other column is a scrambling code of length K. In addition to the table, a certain mapping rule may also be used, a scrambling code or a part of the scrambling code is obtained from (N−K) bits or some values generated by the (N−K) bits, and the final scrambling code may be obtained by performing certain operations and by using the part of the scrambling code. For example, the addressing of a scrambling sequence memory or the lookup table may be determined according to other (N−K) bits among the decoded N bits, or jointly determined according to the other (N−K) bits among the decoded N bits and the information S agreed between the transmitting side and the receiving side; or jointly determined according to the other (N−K) bits among the decoded N bits and the bit sequence M agreed between the transmitting side and the receiving side.

In some embodiments, the method may further include: for the recovered N bits, generating a symbol according to a symbol generation process on the transmitting side; performing channel estimation by using the generated symbol; and performing interference cancellation based on an estimated channel.

In some embodiments, a symbol is generated according to a symbol generation process on a transmitting side, and the symbol is used for channel estimation, so that interference cancellation can be performed according to an estimated channel, and thus the accuracy of channel estimation of an Internet of things (IoT) device during interference cancellation is effectively improved, residual interference is reduced, and multi-user detection performance is improved.

In some embodiments, the step of generating a symbol according to a symbol generation process on the transmitting side may further include: performing pseudo-randomization processing on part of the decoded N bits $b_1, b_2, \ldots, b_N$ that a decoder has successfully decoded to generate new N bits $d_1, d_2, \ldots, d_N$; and encoding the $d_1, d_2, \ldots, d_N$.

When the encoding includes forward error correction (FEC) encoding, after encoding the $d_1, d_2, \ldots, d_N$, the method includes: forming a codeword bit according to the FEC encoding, and generating a symbol after constellation modulation is performed on the codeword bit; or forming a codeword bit according to the FEC encoding, performing multi-dimensional modulation on the codeword bit, expanding the codeword bit subjected to the multi-dimensional modulation, and mapping the expanded codeword bit to a corresponding time-frequency resource; or forming a codeword bit according to the FEC encoding, performing multi-dimensional modulation on the codeword bit, and sparsely mapping the codeword bit subjected to the multi-dimensional modulation to a corresponding time-frequency resource; or forming a codeword bit according to the FEC encoding, interleaving the codeword bit after bit repetition is performed on the codeword bit, and obtaining a symbol according to a preset processing process; or forming a codeword bit according to the FEC encoding, scrambling the codeword bit after bit repetition is performed on the codeword bit, and obtaining a symbol according to a preset processing process.

The criterion for determining the successful decoding of the decoder may include any of: passing the cyclic redundancy check (CRC) check, satisfying self-constraint conditions of forward error correction (FEC) codewords, or passing the cyclic redundancy check (CRC) check and satisfying self-constraint conditions of forward error correction (FEC) codewords.

Embodiment Four

The embodiment of the present disclosure takes a transceiver system composed of a transmitting side and a receiving side as an example, and exemplarily describes procedures of the transmitting side (such as a base station) and the receiving side (such as a UE, a receiver) to further describe the methods in embodiment one to embodiment three. In the processing of the transmitting side in the embodiment of the present disclosure, (N−K) bits are taken out from N information bits generated after the CRC (CRC may not be present in some specific scenes) is added to all information bits to generate a scrambling code of length K, the scrambling code of length K is used to scramble the K information bits, the K information bits are combined with the (N−K) information bits to obtain N information bits, the N information bits are partially scrambled and then are subjected to FEC encoding. The code rate is set to be r, and the length of the encoded bit stream is N/r.

Figure 6:
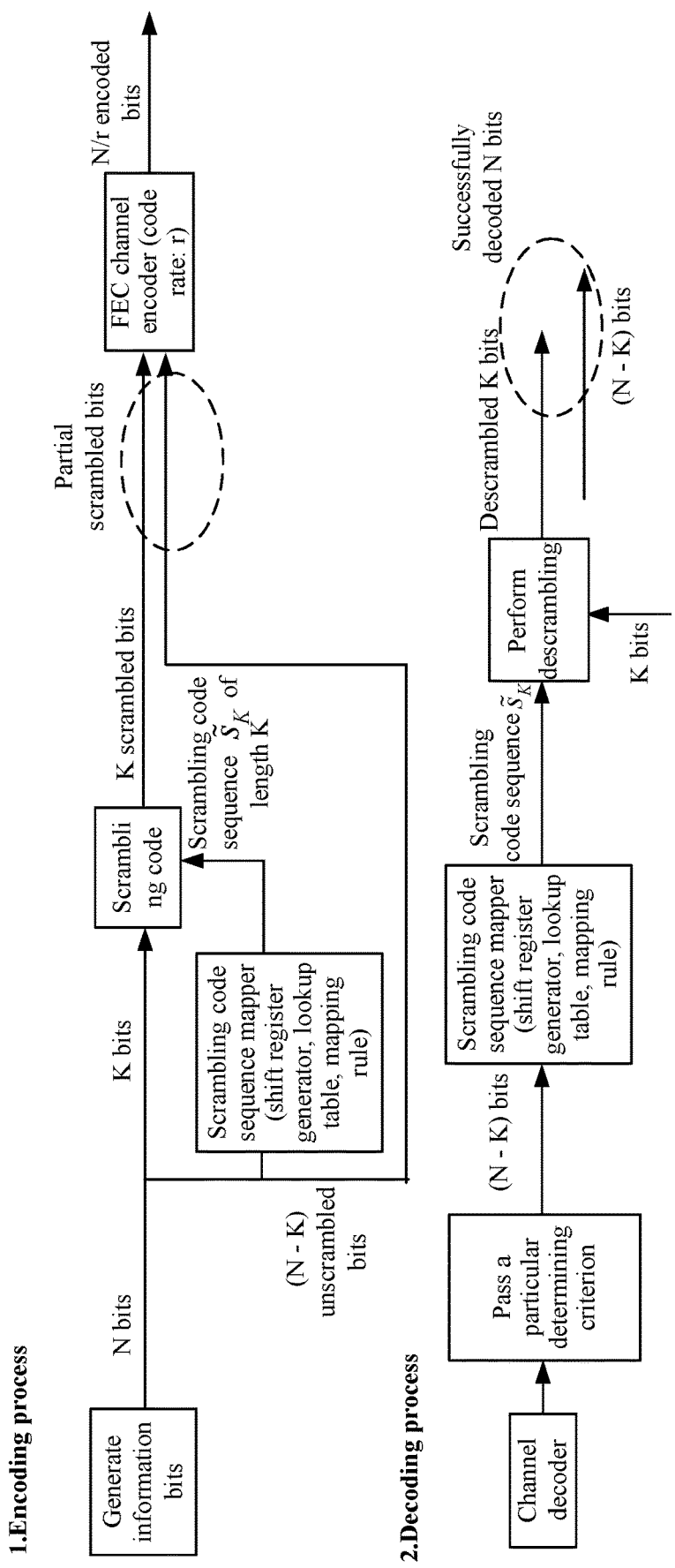
FIG. 6 is a flowchart of a transmitting side and a receiving side not using CRC according to an embodiment of the present disclosure.

As shown in FIG. 6, for a transceiving system which does not adopt the CRC, a receiver determines, through a specific rule, that a user obtains correct decoding, identifies (N−K) bits from the decoded N bits according to the rule pre-agreed between the base station and the UE, then generates a scrambling code of length K according to the (N−K) bits, then descrambles the K bits by using the scrambling code of length K, and combines the descrambled K bits and unscrambled (N−K) bits among the N information bits into N bits by using the same rule as the rule of the transmitting side.

Figure 7:
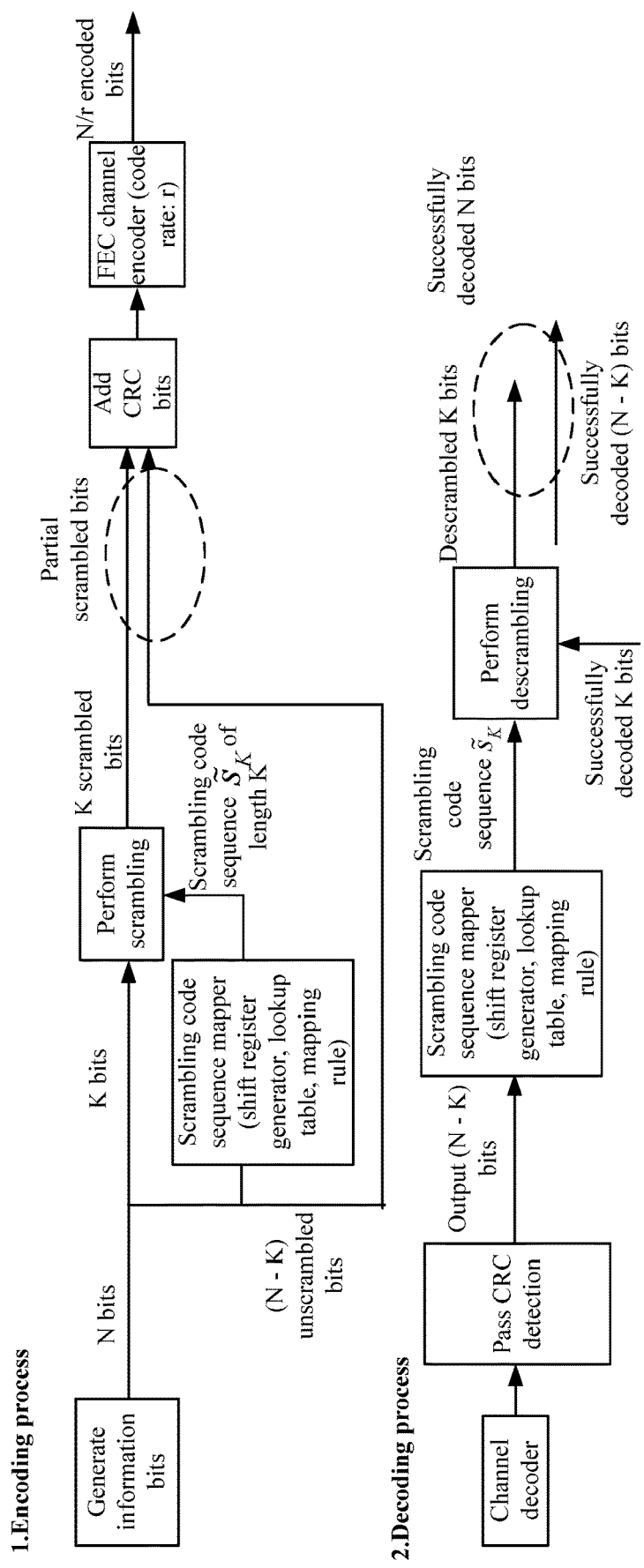
FIG. 7 is a flowchart of a transmitting side and a receiving side in which partial scrambling is applied before CRC encoding is performed according to an embodiment of the present disclosure.

As shown in FIG. 7, for a transceiving system adopting the CRC, scrambling of partial codewords is performed before CRC encoding. The decoder determines the decoding is correct according to the CRC. The receiver identifies (N−K) bits according to the rule pre-agreed between the base station and the UE, then generates a scrambling code of length K according to the (N−K) bits, then descrambles the K bits by using the scrambling code of length K, combines the descrambled K bits and the unscrambled (N−K) bits into N bits by adopting the same rule as the rule of the transmitting side, where the N bits pass CRC detection to determine that the N bits are indeed decoded successfully.

Figure 8:
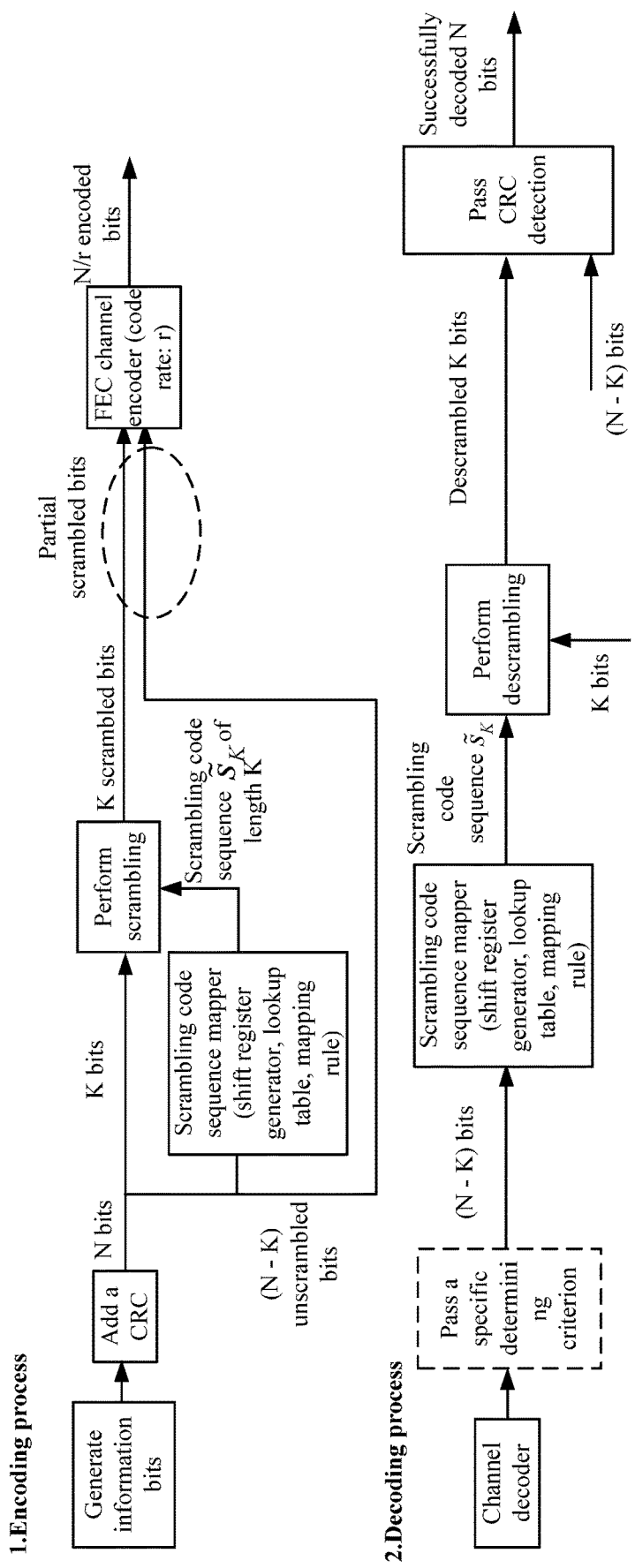
FIG. 8 is a flowchart of a transmitting side and a receiving side in which partial scrambling is applied after CRC encoding is performed according to an embodiment of the present disclosure.

As shown in FIG. 8, for the transceiving system adopting the CRC, after CRC encoding, scrambling of partial codewords is performed, the receiver optionally identifies, according to the rule pre-agreed between the base station and the UE, (N−K) bits from the bits satisfying the self-constraint of the codeword, then generates a scrambling code of length K according to the (N−K) bits, then descrambles the K bits by using the scrambling code of length K, combines the descrambled K bits and the unscrambled (N−K) bits into N bits by adopting the same rule as the rule of the transmitting side, where the N bits pass CRC detection to determine that the N bits are indeed decoded successfully.

Embodiment Five

Figure 9:
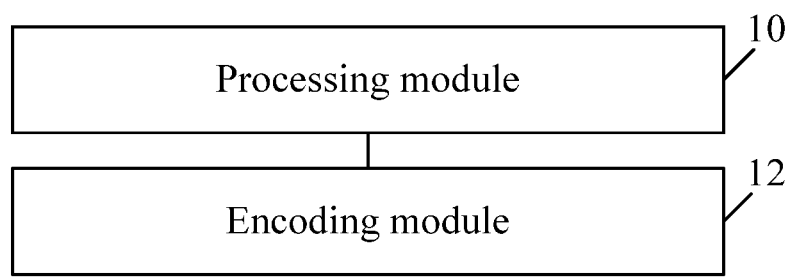
FIG. 9 is a schematic structural diagram of an encoding apparatus according to an embodiment of the present disclosure.

The embodiment of the present disclosure provides an encoding apparatus. As shown in FIG. 9, the apparatus includes a processing module 10 and an encoding module 12.

The processing module 10 is configured to perform pseudo-randomization processing on part of N bits $b_1, b_2, \ldots, b_N$ to generate new N bits $d_1, d_2, \ldots, d_N$.

The encoding module 12 is configured to encode the $d_1, d_2, \ldots, d_N$.

In some embodiments, the $b_1, b_2, \ldots, b_N$ is assumed to include K bits $b_1^R, b_2^R, \ldots, b_K^R$ and other (N−K) bits $b_1^U, b_2^U, \ldots, b_{N-K}^U$, and the $d_1, d_2, \ldots, d_N$ is assumed to include K bits $d_1^R, d_2^R, \ldots, d_K^R$ and other (N−K) bits $d_1^U, d_2^U, \ldots, d_{N-K}^U$; the processing module 10 is specifically configured to perform pseudo-randomization processing on the $b_1^R, b_2^R, \ldots, b_K^R$ to generate the $d_1^R, d_2^R, \ldots, d_K^R$ and take the $b_1^U, b_2^U, \ldots, b_{N-K}^U$ as the $d_1^U, d_2^U, \ldots, d_{N-K}^U$. The pseudo-randomization processing in the operation of performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_{N-K}^U$, or jointly determined by the $b_1^U, b_2^U, \ldots, b_{N-K}^U$ and information S agreed with a receiving side, or jointly determined by the $b_1^U, b_2^U, \ldots, b_{N-K}^U$ and a bit sequence M agreed with a receiving side; where K is greater than 0 and less than or equal to N.

In some embodiments, the $b_1, b_2, \ldots, b_N$ is assumed to include K bits $b_1^R, b_2^R, \ldots, b_K^R$ and other (N−K) bits $b_1^U, b_2^U, \ldots, b_{N-K}^U$, and the $d_1, d_2, \ldots, d_N$ is assumed to include K bits $d_1^R, d_2^R, \ldots, d_K^R$ and other (N−K) bits $d_1^U, d_2^U, \ldots, d_{N-K}^U$; the processing module 10 is specifically configured to perform pseudo-randomization processing on the $b_1^R, b_2^R, \ldots, b_K^R$ to generate the $d_1^R, d_2^R, \ldots, d_K^R$ and process the $b_1^U, b_2^U, \ldots, b_{N-K}^U$ in a manner which is agreed with a receiving side to generate $d_1^U, d_2^U, \ldots, d_{N-K}^U$. The pseudo-randomization processing in the operation of performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_{N-K}^U$, or determined by the $d_1^U, d_2^U, \ldots, d_{N-K}^U$, or jointly determined by the $b_1^U, b_2^U, \ldots, b_{N-K}^U$ and information S agreed with a receiving side, or jointly determined by the $b_1^U, b_2^U, \ldots, b_{N-K}^U$ and a bit sequence M agreed with a receiving side, or jointly determined by the $d_1^U, d_2^U, \ldots, d_{N-K}^U$ and information S agreed with the receiving side, or jointly determined by $d_1^U, d_2^U, \ldots, d_{N-K}^U$ and a bit sequence M agreed with the receiving side; where K is greater than 0 and less than or equal to N.

In some embodiments, the $b_1, b_2, \ldots, b_N$ is assumed to include K bits $b_1^R, b_2^R, \ldots, b_K^R$ and other (N−K) bits $b_1^U, b_2^U, \ldots, b_{N-K}^U$, and the $d_1, d_2, \ldots, d_N$ is assumed to include K bits $d_1^R, d_2^R, \ldots, d_K^R$ and other (N−K) bits $d_1^U, d_2^U, \ldots, d_{N-K}^U$; the processing module 10 is specifically configured to perform scrambling processing on the $b_1^R, b_2^R, \ldots, b_K^R$ by using a pseudo-random sequence $c_1, c_2, \ldots, c_K$ of length K to generate the $d_1, d_2, \ldots, d_N$ and configured to take the $b_1^U, b_2^U, \ldots, b_{N-K}^U$ as $d_1^U, d_2^U, \ldots, d_{N-K}^U$. The generation of the pseudo-random sequence $c_1, c_2, \ldots, c_K$ of length K is determined by the $b_1^U, b_2^U, \ldots, b_{N-K}^U$, or jointly determined by the $b_1^U, b_2^U, \ldots, b_{N-K}^U$ and information S agreed with a receiving side, or jointly determined by the $b_1^U, b_2^U, \ldots, b_{N-K}^U$ and a bit sequence M agreed with a receiving side; where K is greater than 0 and less than or equal to N.

In some embodiments, the $b_1, b_2, \ldots, b_N$ is assumed to include K bits $b_1^R, b_2^R, \ldots, b_K^R$ and other (N−K) bits $b_1^U, b_2^U, \ldots, b_{N-K}^U$, and the $d_1, d_2, \ldots, d_N$ is assumed to includes K bits $d_1^R, d_2^R, \ldots, d_K^R$ and other (N−K) bits $d_1^U, d_2^U, \ldots, d_{N-K}^U$; the processing module 10 is specifically configured to perform scrambling processing on the $b_1^R, b_2^R, \ldots, b_K^R$ by using a pseudo-random sequence $c_1, c_2, \ldots, c_K$ of length K to generate the $d_1^R, d_2^R, \ldots, d_K^R$ and configured to process the $b_1^U, b_2^U, \ldots, b_{N-K}^U$ in a manner which is agreed with a receiving side to generate the $d_1^U, d_2^U, \ldots, d_{N-K}^U$. The generation of the pseudo-random sequence $c_1, c_2, \ldots, c_K$ of length K is determined by the $b_1^U, b_2^U, \ldots, b_{N-K}^U$, or determined by the $d_1^U, d_2^U, \ldots, d_{N-K}^U$, or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side, or jointly determined by the $d_1^U, d_2^U, \ldots, d_{N-K}^U$ and information S agreed with the receiving side, or jointly determined by the $d_1^U, d_2^U, \ldots, d_{N-K}^U$ and a bit sequence M agreed with the receiving side; where K is greater than 0 and less than or equal to N.

In some embodiments, the information S agreed with the receiving side may include at least one of a system frame index (that is a system frame number), a transmission slot index (that is a transmission slot number or a symbol index), a cell identifier, a sector identifier, a beam identifier, related information of a preamble and a demodulation pilot, or agreed information.

In some embodiments, the bit sequence M agreed with the receiving side may include at least one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

In some embodiments, when the processing module 10 processes $b_1^U, b_2^U, \ldots, b_{N-K}^U$ in a manner which is agreed with a receiving side to generate the $d_1^U, d_2^U, \ldots, d_{N-K}^U$, the processing module 10 may also be specifically configured to perform at least one of the following operations: processing the $b_1^U, b_2^U, \ldots, b_{N-K}^U$ by using information agreed with the receiving side to generate the $d_1^U, d_2^U, \ldots, d_{N-K}^U$, where the information agreed with the receiving side includes one of: a system frame index (that is a system frame number), a transmission slot index (that is a transmission slot number or a symbol index), a cell identifier, a sector identifier, a beam identifier, related information of a preamble and a demodulation pilot, or agreed information; or processing the $b_1^U, b_2^U, \ldots, b_{N-K}^U$ by using a bit sequence agreed with the receiving side to generate the $d_1^U, d_2^U, \ldots, d_{N-K}^U$, where the bit sequence agreed with the receiving side includes one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

In some embodiments, the related information of a preamble and a demodulation pilot may include one of: a preamble root index, a cyclic shift sequence index, a demodulation pilot root index, a demodulation pilot cyclic shift sequence index, a demodulation reference signal (DMRS) comb pattern, or a demodulation reference signal orthogonal cover code (OCC) pattern.

In some embodiments, the encoding includes at least one of forward error correction (FEC) encoding or cyclic redundancy check (CRC) encoding; when the encoding includes the forward error correction (FEC) encoding, after the $d_1$, $d_2$, ..., $d_N$ is encoded, the encoding module 12 is further configured to form a codeword bit according to the FEC encoding, and expand a modulation symbol generated after the codeword bit is modulated; or form a codeword bit according to the FEC encoding, perform multi-dimensional modulation on the codeword bit, expand the codeword bit subjected to the multi-dimensional modulation, and map the expanded codeword bit to a corresponding time-frequency resource; or form a codeword bit according to the FEC encoding, perform multi-dimensional modulation on the codeword bit, and sparsely map the codeword bit to a corresponding time-frequency resource; or form a codeword bit according to the FEC encoding, and interleave codeword bits after bit repetition is performed on the codeword bit; or form a codeword bit according to the FEC encoding, and scramble codeword bits after bit repetition is performed on the codeword bit.

The embodiment of the present disclosure is an apparatus embodiment corresponding to embodiment one and embodiment two, and has corresponding technical effects.

Embodiment Six

Figure 10:
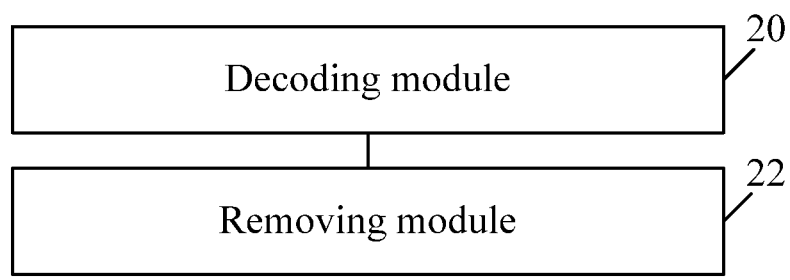
FIG. 10 is a schematic structural diagram of a decoding apparatus according to an embodiment of the present disclosure.

The embodiment of the present disclosure provides a decoding apparatus. As shown in FIG. 10, the apparatus includes a decoding module 20 and a removing module 22.

The decoding module 20 is configured to decode encoded N bits.

The removing module 22 is configured to perform pseudo-randomization removing processing on K bits among the decoded N bits to recover N bits before pseudo-randomization processing is performed on a transmitting side; where K is greater than 0 and less than or equal to N.

In some embodiments, when the removing module 22 performs pseudo-randomization removing processing on K bits among the decoded N bits, the removing module 22 is specifically configured to perform pseudo-randomization removing processing on the K bits according to other (N−K) bits among the decoded N bits; or perform pseudo-randomization removing processing on the K bits according to other (N−K) bits among the decoded N bits and information S agreed between a transmitting side and a receiving side; or perform pseudo-randomization removing processing on the K bits according to other (N−K) bits among the decoded N bits and a bit sequence M agreed between a transmitting side and a receiving side.

The information S agreed between the transmitting side and the receiving side may include at least one of: a system frame index (that is a system frame number), a transmission slot index (that is a transmission slot number or a symbol index), a cell identifier, a sector identifier, a beam identifier, related information of a preamble and a demodulation pilot, or agreed information.

The bit sequence M agreed between the transmitting side and the receiving side may include at least one of: a bit sequence determined by a system frame index (that is a system frame number), a bit sequence determined by a transmission slot index (that is a transmission slot number or a symbol index), a bit sequence determined by a cell identifier, a bit sequence determined by a sector identifier, a bit sequence determined by a beam identifier, a bit sequence determined by related information of a preamble and a demodulation pilot, or an agreed bit sequence.

In some embodiments, when the removing module 22 performs pseudo-randomization removing processing on K bits among the decoded N bits, the removing module 22 is specifically configured to perform descrambling processing on the K bits by using a pseudo-random sequence of length K.

In some embodiments, the apparatus further includes an estimation module.

The estimation module is configured to, for the recovered N bits, generate a symbol according to a symbol generation process on the transmitting side; perform channel estimation by using the generated symbol; and perform interference cancellation based on an estimated channel.

The embodiment of the present disclosure is an apparatus embodiment corresponding to embodiment three, and has corresponding technical effects.

Embodiment Seven

The embodiment of the present disclosure provides a transmitting device. The device includes a memory and a processor; the memory is configured to store an encoding computer program, and the processor may execute the computer program to perform the steps of the method of any one of the embodiment one or the embodiment two.

Embodiment Eight

The embodiment of the present disclosure provides a receiving device. The device includes a memory and a processor; the memory is configured to store a decoding computer program, and the processor may execute the computer program to perform the steps of any method in the embodiment three.

Embodiment Nine

The embodiment of the present disclosure provides a computer storage medium, and the storage medium is configured to store at least one of an encoding computer program or a decoding computer program.

When the encoding computer program is executed by at least one processor, the encoding computer program is used for implementing steps of the method of any one of the embodiment one or the embodiment two.

When the decoding computer program is executed by at least one processor, the decoding computer program is used for implementing steps of any method in the embodiment three.

The computer-readable storage medium in embodiments of the present disclosure may be a random access memory (RAM) memory, a flash memory, a read-only memory (ROM), an Erasable Programmable Read-Only Memory (EPROM), an Electrically Erasable Programmable Read-only Memory (EEPROM), a register, a hard disk, a removable hard drive, a compact disc read-only memory (CD-ROM), or any other form of storage medium known in the art. A storage medium may be coupled to the processor, so that the processor can read information from the storage medium and write information to the storage medium; or the storage medium may be a component of the processor. The processor and the storage medium may be located in an application specific integrated circuit.

It should be noted here that, in specific implementation, for the embodiments seven to ten, reference may be made to the embodiments one to six, which have corresponding technical effects.

The embodiments described above further describe the purpose, solutions, and beneficial effects of the present disclosure in detail. It should be understood that the above descriptions are only embodiments of the present disclosure and are not intended to limit the scope of the present disclosure. Any modification, equivalent substitution, improvement, etc. made within the spirit and principle of the present disclosure shall fall in the scope of the present disclosure.

What is claimed is:

1. A partial pseudo-randomization processing method, applied to a transmitting side, comprising:
performing, by the transmitting side, pseudo-randomization processing on part of N bits $b_1, b_2, \ldots, b_N$ to generate new N bits $d_1, d_2, \ldots, d_N$;
encoding, by the transmitting side, the $d_1, d_2, \ldots, d_N$ to obtain encoded N bits; and
sending, by the transmitting side, the encoded N bits to a receiving side,
wherein the performing, by the transmitting side, pseudo-randomization processing on part of N bits $b_1, b_2, \ldots, b_N$ to generate new N bits $d_1, d_2, \ldots, d_N$ comprises:
assuming that the $b_1, b_2, \ldots, b_N$ comprises K bits $b_1^R, b_2^R, \ldots, b_K^R$ and other (N–K) bits $d_1^U, d_2^U, \ldots, d_{N-K}^U$;
assuming that the $d_1, d_2, \ldots, d_N$ comprises K bits $d_1^R, d_2^R, \ldots, d_N^R$ and other (N–K) bits $d_1^U, d_2^U, \ldots, d_{N-K}^U$;
generating, by a scrambling code generator, a pseudo-random sequence $c_1, c_2, \ldots c_K$ of length K;
performing scrambling processing on the $b_1^R, b_2^R, \ldots, b_K^R$ by using the pseudo-random sequence $c_1, c_2, \ldots, c_K$ of length K to generate the $d_1^R, d_2^R, \ldots, d_K^R$; and
taking the $b_1^U, b_2^U, \ldots, b_{N-K}^U$ as the $d_1^U, d_2^U, \ldots, d_{N-K}^U$;
wherein generation of the pseudo-random sequence $c_1, c_2, \ldots, c_K$ of length K is determined by the $b_1^U, b_2^U, \ldots, b_{N-K}^U$, or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side; wherein K is greater than 0 and less than or equal to N.

2. The method of claim 1, wherein the performing, by the transmitting side, pseudo-randomization processing on part of N bits $b_1, b_2, \ldots, b_N$ to generate new N bits $d_1, d_2, \ldots, d_N$ comprises:
assuming that the $b_1, b_2, \ldots, b_N$ comprises K bits $b_1^R, b_2^R, \ldots, b_K^R$ and other (N–K) bits $b_1^U, b_2^U, \ldots, b_{N-K}^U$; and
assuming that the $d_1, d_2, \ldots, d_N$ comprises K bits $d_1^R, d_2^R, \ldots, d_K^R$ and other (N–K) bits $d_1^R, d_2^R, \ldots, d_K^R$; and
performing pseudo-randomization processing on the $b_1^R, b_2^R, \ldots, b_K^R$ to generate the $d_1^R, d_2^R, \ldots, d_K^R$; and
taking the $b_1^U, b_2^U, \ldots, b_{N-K}^U$ as the $d_1^U, d_2^U, \ldots, d_{N-K}^U$;
wherein the pseudo-randomization processing in the performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_{N-K}^U$, or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side; wherein K is greater than 0 and less than or equal to N.

3. The method of claim 2, wherein the information S agreed with the receiving side comprises at least one of:
a system frame index, a transmission slot index, a cell identifier, a sector identifier, a beam identifier, related information of a preamble and a demodulation pilot, or agreed information,
wherein the bit sequence M agreed with the receiving side comprises at least one of:
a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

4. The method of claim 2, wherein the encoding comprises at least one of forward error correction (FEC) encoding or cyclic redundancy check (CRC) encoding.

5. The method of claim 1, wherein the performing, by the transmitting side, pseudo-randomization processing on part of N bits $b_1, b_2, \ldots, b_N$ to generate new N bits $d_1, d_2, \ldots, d_N$ comprises:
assuming that the $b_1, b_2, \ldots, b_N$ comprises K bits $b_1^R, b_2^R, \ldots, b_K^R$ and other (N–K) bits $b_1^U, b_2^U, \ldots, b_{N-K}^U$; and
assuming that the $d_1, d_2, \ldots, d_N$ comprises K bits $d_1^R, d_2^R, \ldots, d_K^R$ (N–K) bits $d_1^U, d_2^U, \ldots, d_{N-K}^U$;
performing pseudo-randomization processing on the $b_1^R, b_2^R, \ldots, b_K^R$ to generate the $d_1^R, d_2^R, \ldots, d_K^R$; and
processing the $b_1^U, b_2^U, \ldots, b_{N-K}^U$ in a manner which is agreed with the receiving side to generate the $d_1^U, d_2^U, \ldots, d_{N-K}^U$;
wherein the pseudo-randomization processing in the performing pseudo-randomization processing on the $b_1^R, b_2^R, \ldots, b_K^R$ to generate the $d_1^R, d_2^R, \ldots, d_K^R$ is determined by the $b_1^U, b_2^U, \ldots, b_{N-K}^U$, or determined by the $d_1^U, d_2^R, \ldots, d_{N-K}^U$ or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side, or jointly determined by the $d_1^U, d_2^R, \ldots, d_{N-K}^U$ and information S agreed with the receiving side, or jointly determined by the $d_1^U, d_2^R, \ldots, d_{N-K}^U$ and a bit sequence M agreed with the receiving side; wherein K is greater than 0 and less than or equal to N.

6. The method of claim 5, wherein the processing the $b_1^U, b_2^U, \ldots, b_{N-K}^U$ in a manner which is agreed with the receiving side to generate the $d_1^U, d_2^U, \ldots, d_{N-K}^U$ comprises at least one of:
processing the $b_1^U, b_2^U, \ldots, b_{N-K}^U$ by using information agreed with the receiving side to generate the $d_1^U, d_2^U, \ldots, d_{N-K}^U$, wherein the information agreed with the receiving side comprises one of: a system frame index, a transmission slot index, a cell identifier, a sector identifier, a beam identifier, related information of a preamble and a demodulation pilot, or agreed information; or processing the $b_1^U, b_2^U, \ldots, b_{N-K}^U$ by using a bit sequence agreed with the receiving side to generate the $d_1^U, d_2^U, \ldots, d_{N-K}^U$ wherein the bit sequence agreed with the receiving side comprises one of: a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

7. The method of claim 6, wherein the related information of a preamble and a demodulation pilot comprises one of:

a preamble root index, a cyclic shift sequence index, a demodulation pilot root index, a demodulation pilot cyclic shift sequence index, a demodulation reference signal (DMRS) comb pattern, or a demodulation reference signal orthogonal cover code (OCC) pattern.

8. The method of claim 5, wherein the information S agreed with the receiving side comprises at least one of:

a system frame index, a transmission slot index, a cell identifier, a sector identifier, a beam identifier, related information of a preamble and a demodulation pilot, or agreed information, wherein the bit sequence M agreed with the receiving side comprises at least one of:

a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

9. The method of claim 1, wherein the performing, by the transmitting side, pseudo-randomization processing on part of N bits $b_1, b_2, \ldots, b_N$ to generate new N bits $d_1, d_2, \ldots, d_N$ comprises:

assuming that the $b_1, b_2, \ldots, b_N$ comprises K bits $b_1^R, b_2^R, \ldots, b_K^R$ and other (N–K) bits $b_1^U, b_2^U, \ldots, b_{N-K}^U$; and assuming that the $d_1, d_2, \ldots, d_N$ comprises K bits $d_1^R, d_2^R, \ldots, d_K^R$ and other (N–K) bits $d_1^U, d_2^R, \ldots, d_{N-K}^U$;

performing scrambling processing on the $b_1^R, b_2^R, \ldots, b_K^R$ by using a pseudo-random sequence $c_1, c_2, \ldots, c_K$ to generate the $d_1^R, d_2^R, \ldots, d_K^R$; and processing the $b_1^U, b_2^U, \ldots, b_{N-K}^U$ in a manner which is agreed with the receiving side to generate the $d_1^U, d_2^U, \ldots, d_{N-K}^U$;

wherein generation of the pseudo-random sequence $c_1, c_2, \ldots, c_K$ of length K is determined by the $b_1^U, b_2^U, \ldots, b_{N-K}^U$ or determined by the $d_1^U, d_2^U, \ldots, d_{N-K}^U$ or jointly determined by the $b_1^U, b_2^U, \ldots, b_{N-K}^U$ and information S agreed with the receiving side, or jointly determined by the $b_1^U, b_2^U, \ldots, b_{N-K}^U$ and a bit sequence M agreed with the receiving side, or jointly determined by the $d_1^U, d_2^U, \ldots, d_{N-K}^U$ and information S agreed with the receiving side, or jointly determined by the $d_1^U, d_2^U, \ldots, d_{N-K}^U$ and a bit sequence M agreed with the receiving side; wherein K is greater than 0 and less than or equal to N.

10. The method of claim 9, wherein the information S agreed with the receiving side comprises at least one of:

a system frame index, a transmission slot index, a cell identifier, a sector identifier, a beam identifier, related information of a preamble and a demodulation pilot, or agreed information, wherein the bit sequence M agreed with the receiving side comprises at least one of:

a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

11. The method of claim 9, wherein the processing the $b_1^U, b_2^U, \ldots, b_{N-K}^U$ in a manner which is agreed with the receiving side to generate the $d_1^U, d_2^U, \ldots, d_{N-K}^U$ comprises at least one of:

processing the $b_1^U, b_2^U, \ldots, b_{N-K}^U$ by using information agreed with the receiving side to generate the $d_1^U, d_2^U, \ldots, d_{N-K}^U$, wherein the information agreed with the receiving side comprises one of: a system frame index, a transmission slot index, a cell identifier, a sector identifier, a beam identifier, related information of a preamble and a demodulation pilot, or agreed information; or processing the $b_1^U, b_2^U, \ldots, b_{N-K}^U$ by using a bit sequence agreed with the receiving side to generate the $d_1^U, d_2^U, \ldots, d_{N-K}^U$, wherein the bit sequence agreed with the receiving side comprises one of: a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

12. The method of claim 1, wherein the information S agreed with the receiving side comprises at least one of:

a system frame index, a transmission slot index, a cell identifier, a sector identifier, a beam identifier, related information of a preamble and a demodulation pilot, or agreed information, wherein the bit sequence M agreed with the receiving side comprises at least one of:

a bit sequence determined by a system frame index, a bit sequence determined by a transmission slot index, a bit sequence determined by a cell identifier, a bit sequence determined by a sector identifier, a bit sequence determined by a beam identifier, a bit sequence determined by related information of a preamble and a demodulation pilot, or an agreed bit sequence.

13. The method of claim 12, wherein the related information of a preamble and a demodulation pilot comprises one of:

a preamble root index, a cyclic shift sequence index, a demodulation pilot root index, a demodulation pilot cyclic shift sequence index, a demodulation reference signal (DMRS) comb pattern, or a demodulation reference signal orthogonal cover code (OCC) pattern.

14. The method of claim 1, wherein the encoding comprises at least one of forward error correction (FEC) encoding or cyclic redundancy check (CRC) encoding.

15. The method of claim 14, wherein in a case where the encoding comprises the forward error correction (FEC) encoding, after the encoding $d_1, d_2, \ldots, d_N$, the method comprises:
- forming a codeword bit according to the FEC encoding, and expanding a modulation symbol generated after the codeword bit is modulated; or
- forming a codeword bit according to the FEC encoding, performing multi-dimensional modulation on the codeword bit, expanding the codeword bit subjected to the multi-dimensional modulation, and mapping the expanded codeword bit to a corresponding time-frequency resource; or
- forming a codeword bit according to the FEC encoding, performing multi-dimensional modulation on the codeword bit, and sparsely mapping the codeword bit subjected to the multi-dimensional modulation to a corresponding time-frequency resource; or
- forming a codeword bit according to the FEC encoding, and interleaving the codeword bit after bit repetition is performed on the codeword bit; or
- forming a codeword bit according to the FEC encoding, and scrambling the codeword bit after bit repetition is performed on the codeword bit.

16. A transmitting device, comprising a computer-readable storage medium and a processor; the computer-readable storage medium is configured to store an encoding computer program, and the processor is capable of executing the computer program to perform steps of the method of claim 1.

17. A partial pseudo-randomization processing method, applied to a receiving side, comprising:
- receiving, by the receiving side, encoded N bits sent by a transmitting side;
- decoding, by the receiving side, the encoded N bits; and
- performing, by the receiving side, pseudo-randomization removing processing on K bits among the decoded N bits, to recover N bits before pseudo-randomization processing is performed on a transmitting side; wherein K is greater than 0 and less than or equal to N,
- wherein the performing, by the receiving side, pseudo-randomization removing processing on K bits among the decoded N bits comprises:
- generating, by a scrambling code generator, a pseudo-random sequence of length K;
- performing descrambling processing on the K bits by using the pseudo-random sequence of length K,
- wherein generation of the pseudo-random sequence of length K is determined by other (N−K) bits among the decoded N bits, or jointly determined according to other (N−K) bits among the decoded N bits and information S agreed between the transmitting side and the receiving side; or jointly determined according to other (N−K) bits among the decoded N bits and a bit sequence M agreed between the transmitting side and the receiving side.

18. The method of claim 17, wherein the performing, by the receiving side, pseudo-randomization removing processing on K bits among the decoded N bits comprises:
- performing the pseudo-randomization removing processing on the K bits according to other (N−K) bits of the decoded N bits; or
- performing the pseudo-randomization removing processing on the K bits according to other (N−K) bits of the decoded N bits and information S agreed between the transmitting side and the receiving side; or
- performing the pseudo-randomization removing processing on the K bits according to other (N−K) bits of the decoded N bits and a bit sequence M agreed between the transmitting side and the receiving side;
- wherein the information S agreed between the transmitting side and the receiving side comprises at least one of:
- a system frame index, a transmission slot index, a cell identifier, a sector identifier, a beam identifier, related information of a preamble and a demodulation pilot, or agreed information;
- wherein the bit sequence M agreed between the transmitting side and the receiving side comprises at least one of:
- a bit sequence determined by the system frame number, a bit sequence determined by the transmission slot number, a bit sequence determined by the cell identifier, a bit sequence determined by the sector identifier, a bit sequence determined by the beam identifier, and a bit sequence determined by the related information of a preamble and a demodulation pilot, or an agreed bit sequence.

19. The method of claim 17, further comprising:
- for the recovered N bits, generating a symbol according to a symbol generation process on the transmitting side;
- performing channel estimation by using the generated symbol; and
- performing interference cancellation based on an estimated channel.

20. A receiving device, comprising a computer-readable storage medium and a processor; the computer-readable storage medium is configured to store a decoding computer program, and the processor is capable of executing the computer program to perform steps of the method of claim 17.

* * * * *